(12) United States Patent
Schaaf et al.

(10) Patent No.: US 6,816,739 B1
(45) Date of Patent: Nov. 9, 2004

(54) RADIO SYSTEM ATTENUATOR FOR AN ANTENNA

(75) Inventors: Michael L. Schaaf, San Jose, CA (US); Michael Flohr, San Jose, CA (US)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/517,893

(22) Filed: Mar. 3, 2000

(51) Int. Cl.⁷ ............................................... H04B 1/38
(52) U.S. Cl. ..................... 455/562; 455/249.1; 455/269
(58) Field of Search ........................... 455/562, 81, 82, 455/67.1, 67.3, 67.6, 83, 561, 269, 271, 249.1

(56) References Cited

U.S. PATENT DOCUMENTS

| | | | | |
|---|---|---|---|---|
| 4,639,914 A | * | 1/1987 | Winters | 370/334 |
| 4,786,915 A | | 11/1988 | Cartwright et al. | 343/909 |
| 4,888,596 A | * | 12/1989 | Conanan | 343/703 |
| 6,023,203 A | * | 2/2000 | Parish | 455/67.1 |
| 6,031,828 A | | 2/2000 | Koro et al. | 370/336 |
| 6,108,539 A | * | 8/2000 | Ray et al. | 455/430 |
| 6,192,216 B1 | * | 2/2001 | Sabat, Jr. et al. | 455/507 |
| 6,201,961 B1 | * | 3/2001 | Schindall et al. | 455/430 |
| 6,223,021 B1 | * | 4/2001 | Silvia et al. | 455/77 |
| 6,349,200 B1 | * | 2/2002 | Sabat, Jr. et al. | 455/403 |

FOREIGN PATENT DOCUMENTS

| | | |
|---|---|---|
| EP | 0449107 A2 | 10/1991 |
| EP | 0449107 A3 | 10/1991 |
| EP | 0997977 A1 | 5/2000 |
| EP | 997977 A1 * | 5/2000 ........... H01Q/17/00 |

OTHER PUBLICATIONS

Thanh–Tuyen Nguyen and Genevieve Maze–Merceur, "Microwve Characterization of 2–D Random Materials: Numerical Simulations and Experiments", IEEE Transactions on Microwave Theory and Techniques, vol. 46, No. 10, October 1998, pp. 1478–1483.

* cited by examiner

*Primary Examiner*—Tony T. Nguyen
*Assistant Examiner*—Thuan T. Nguyen
(74) *Attorney, Agent, or Firm*—David R. Gildea

(57) ABSTRACT

A radio system having a hub transceiver and a plurality of customer premise transceivers at different distances from the hub transceiver. Each of the customer premise transceivers includes an antenna for transmitting an upstream radio signal to the hub transceiver and receiving a downstream radio signal from the hub transceiver. A selected exchangeable attenuator pad is mounted on the customer premise antenna in the path of the radiated signals for attenuating the upstream and downstream radio signals. The attenuator pad is selected in order to compensate for the different transmission path losses in order to provide a fixed predetermined signal strength in the downstream radio signals to each of the customer premise transceivers and a fixed predetermined signal strength to the hub transceiver from each of the customer premise transceivers.

6 Claims, 2 Drawing Sheets

RADIO SYSTEM ATTENUATOR FOR AN ANTENNA

BACKGROUND OF THE INVENTION

1. Field of the Invention

The invention relates generally to radio systems and more particularly to an exchangeable antenna attenuator pad for a radio system. The radio system includes a hub transceiver and a plurality of customer premise transceivers at different distances from the hub transceiver, each of the customer premise transceivers including an antenna having the exchangeable attenuator pad mounted thereon.

2. Description of the Prior Art

A common type of radio system includes a hub transceiver in radio signal communication with several customer premise transceivers at different distances from the hub. The different distances cause a problem, sometimes called the near-far problem, where the signal strength of the radio signal received from a nearby transceiver is greater, sometimes much greater, than the signal strength of the radio signal received from a faraway transceiver. When the signal strengths vary too greatly the transceivers will not have enough dynamic range to receive the largest signals with minimal distortion while discerning the smallest signals from noise. In order to obtain a good signal-to-noise ratio for the low signal strength radio signals, the receiver in the transceiver must be calibrated so that the maximum received signal strength matches the maximum signal strength for proper operation within the receiver.

Existing radio systems use one of several alternative calibration schemes for attempting to resolve the near-far problem. However, all the alternative schemes have limitations of one kind or another. In one alternative, a variable attenuator is provided at the hub transceiver. The variable attenuator is controlled for providing a different attenuation for communication with each customer premise transceiver. However, such variable attenuator is not often used where the hub transceiver does not have foreknowledge of which of the customer premise transceivers will be next received because the early part of the radio signal for the next customer premise transceiver may be lost before the attenuator can be set to the proper variation.

Other existing radio systems resolve the near-far problem with a variable attenuator at the customer premise transceiver. Typically, the variable attenuator is included in the design of the radio frequency (RF) section of the transceiver very soon or immediately after the antenna in order to prevent overloading the front end of the receiver. The variable antenna may be set to the appropriate attenuation at the customer site during the installation. Unfortunately, such variable attenuator is expensive and the commercial acceptance of the customer premise transceiver is very sensitive to cost. Alternatively, because any one customer premise transceiver is at a fixed distance to the hub transceiver the variable attenuator in the RF section could be replaced by a fixed attenuator pad that is factory-selected for each particular customer premise transceiver. Such fixed attenuator is typically much less expensive than a variable attenuator. However, the factory process of customizing each customer premise transceiver increases the complexity of the order processing, manufacture, inventory, and shipment of the transceiver, thereby increasing its cost. It would be less expensive to install the fixed attenuator in the field at the customer site. However, the RF section and in many cases the entire radio is built onto the antenna as a sealed unit and it is undesirable to open the unit at the site. Conceivably, this problem could be solved where an RF preamplifier built onto the antenna connects with a coaxial cable to the remaining portion of the radio by placing a coaxial attenuator in the cable. However, this is usually not practical because it is usually desirable to power the preamplifier through the coaxial cable.

There is a need for an inexpensive solution to the near-far problem for a radio system having several customer premise transceivers at varying distances from a hub transceiver.

SUMMARY OF THE INVENTION

It is therefore an object of the present invention to provide an exchangeable attenuator pad for mounting to the outside of an antenna in the path of a radio signal radiated by the antenna.

Another object is to provide a radio system having a hub transceiver and a plurality of customer premise transceivers having different transmission path losses between the respective customer premise transceivers and the hub transceiver where each of the customer premise transceivers includes an antenna having a selected exchangeable attenuator pad mounted thereon for compensating for the different transmission path losses and providing predetermined incoming signal strengths at each of the customer premise transceivers and at the hub transceiver.

Briefly, a preferred embodiment of the present invention includes a radio system having a hub transceiver and several remote customer premise transceivers where each customer premise transceiver is in two way communication with the hub transceiver. The customer premise transceiver includes an antenna having an exchangeable attenuator pad of the present invention mounted on the antenna in the path of the airwave signal for attenuating the signal that is transmitted or received with the antenna. The attenuator pad is selected from a set of attenuator pads having differing attenuations. A high level of attenuation is selected where the customer premise transceiver is relatively near to the hub transceiver. A lower level or no attenuation is selected where the customer premise transceiver is relatively far from the hub transceiver.

An advantage of the exchangeable attenuator pad of the present invention is that a radio signal radiated by an antenna is inexpensively and conveniently attenuated by a selectable attenuation without requiring an internal change to a transceiver.

An advantage of the radio system of the present invention is that selected exchangeable attenuator pads selectably attenuate signals for providing predetermined incoming signal strengths at each of the transceivers in the radio system in spite of the different transmission path losses between the transceivers without requiring internal changes to any of the transceivers.

These and other objects and advantages of the present invention will no doubt become obvious to those of ordinary skill in the art after having read the following detailed description of the preferred embodiments which are illustrated in the various figures.

DETAILED DESCRIPTION OF THE PREFERRED EMBODIMENTS

Figure 1:
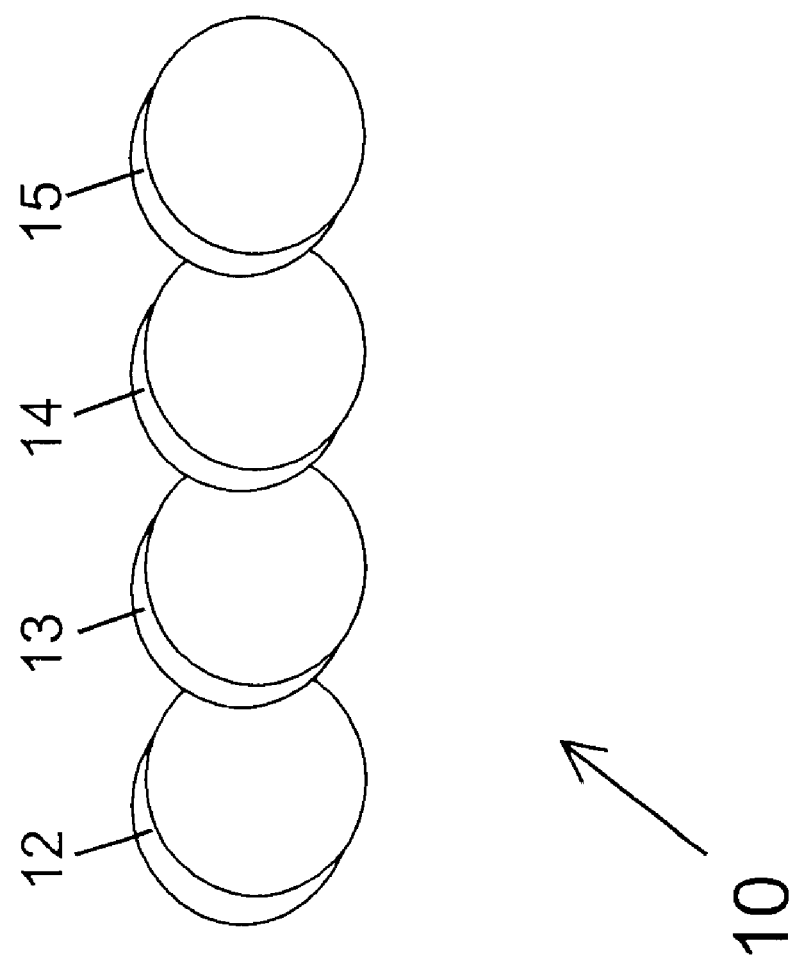
FIG. 1 is a drawing of a set of exchangeable attenuator pads of the present invention.

FIG. 1 is a drawing of a set of attenuator pads of the present invention referred to by the general reference number 10. The set of attenuator pads 10 includes several exchangeable attenuator pads illustrated as an attenuator pad 12, an attenuator pad 13, an attenuator pad 14, and an attenuator pad 15. The attenuator pads 12–15 are constructed to have different attenuations. For example, the attenuator pad 12 can have an attenuation of 6 decibels (dB), the attenuator pad 13 can have an attenuation of 12 dB, the attenuator pad 14 can have an attenuation of 18 dB, and the attenuator pad 15 can have attenuation of 24 dB. Other levels of attenuation including 0 dB can be included in the set 10.

Figure 2:
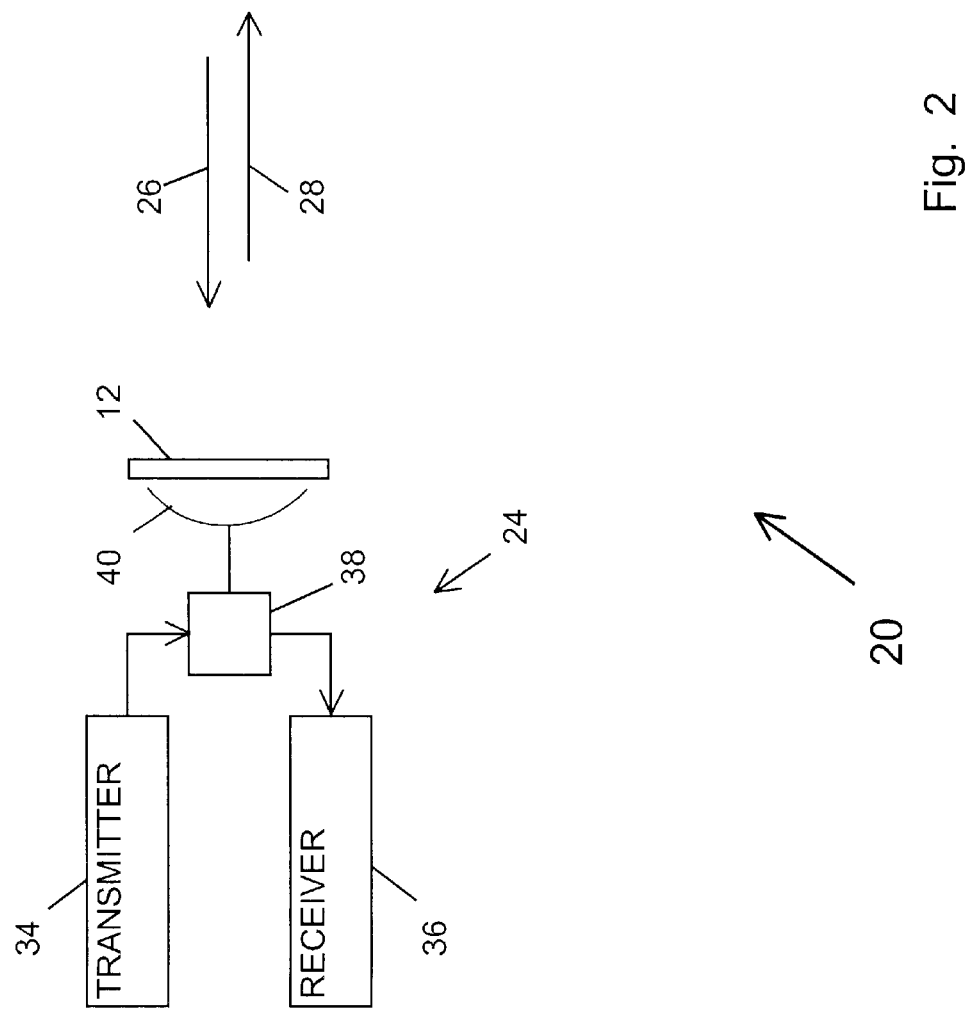
FIG. 2 is a block diagram of a radio system of the present invention using the one of the attenuator pads of FIG. 1.

FIG. 2 is a block diagram of a radio system of the present invention referred to by the reference number 20. The radio system 20 includes a hub transceiver 22, at least one customer premise transceiver 24, and a selected one of the attenuator pads 12–15 at the customer premise transceiver 24. The selected one of the attenuator pads 12–15 is shown in the illustration as the attenuator pad 12. The customer premise transceiver 24 communicates with the hub transceiver 22 by receiving a downstream radio signal 26 from the hub transceiver 22 and transmitting an upstream radio signal 28 to the hub transceiver 22. Typically, the radio system 20 includes a plurality of the customer premise transceivers 24 where each of the customer premise transceivers 24 communicates with the hub transceiver 22 but not with another customer premise transceiver 24 except indirectly through the hub transceiver 22.

The attenuator pad 12 is selected according to a distance between the customer premise transceiver 24 and the hub transceiver 22 for attenuating both the downstream radio signal 26 received by the customer premise transceiver 24 and the upstream radio signal 28 received by the hub transceiver 22 in order to provide predetermined incoming signal strengths at all the customer premise transceivers 24 and the hub transceiver 22. For the typical case of the radio system 20 having one hub transceiver 22 and a plurality of customer premise transceivers 24, it is important that the selected attenuator pad 12 be used with the customer premise transceiver 24 and not the hub transceiver 22. When the customer premise transceiver 24 and the hub transceiver 22 are nearby, one of the attenuator pads 12–15 having a high attenuation is selected. When the customer premise transceiver 24 and the hub transceiver 22 are far away, one of the attenuator pads 12–15 having a low or no attenuation is selected. The set of attenuator pads 10 may include more or fewer than the exemplary four attenuator pads 12–15 depending upon the variation of signal strengths that is to be compensated and the range of incoming signal strength that is tolerable.

The customer premise transceiver 24 includes a transmitter 34, a receiver 36, a splitter 38, and an antenna 40. The attenuator pad 12 mounts on the outside of the antenna 40 in the path of the radiated signals, namely, the downstream radio signal 26 and the upstream radio signal 28. The transmitter 34 includes all of the components required for generating a modulated transmit signal carrying upstream information that is intended for the use of the hub transceiver 22. The transmitter 34 issues the modulated transmit signal to the splitter 38. The splitter 38 passes the modulated transmit signal to the antenna 40. The antenna 40 converts the modulated transmit signal from a conducted form to an airwave form and issues the airwave modulated transmit signal into the attenuator pad 12. The modulated transmit signal is attenuated as it passes through the attenuator pad 12 and then issues from the attenuator pad 12 as the upstream radio signal 28.

The attenuator pad 12 also receives the downstream radio signal 26 from the hub transceiver 22. The downstream radio signal 26 carries modulation for downstream information that is intended for the use of the customer premise transceiver 24. The downstream radio signal 26 is attenuated as it passes through the attenuator pad 12 and issues as a modulated receive signal to the antenna 40. The antenna 40 converts the modulated receive signal from an airwave form to a conducted form and passes the conducted modulated receive signal to the splitter 38. The splitter 38 passes the modulated receive signal to the receiver 36. The receiver 36 includes all the components required for recovering the downstream information and passes the downstream information to a user.

The hub transceiver 22 includes a transmitter 54, a receiver 56, a splitter 58, and an antenna 60. The transmitter 54 includes all of the components required for generating a modulated transmit signal carrying the downstream information that is intended for the use of the customer premise transceiver 24. The transmitter 54 issues the modulated transmit signal to the splitter 58. The splitter 58 passes the modulated transmit signal to the antenna 60. The antenna 60 converts the modulated transmit signal from a conducted form to an airwave form and issues the airwave modulated transmit signal as the downstream radio signal 26.

The upstream radio signal 28 carries modulation for the upstream information that is intended for the use of the customer premise transceiver 24. The antenna 60 receives the upstream radio signal 28, converts the signal from an airwave form to a conducted form, and passes the conducted signal as a modulated receive signal to the splitter 58. The splitter 58 passes the modulated receive signal to the receiver 56. The receiver 56 includes all the components required for recovering the downstream information and passes the downstream information to a user.

The attenuator pads 12–15 in a preferred embodiment are injection molded plastic with embedded attenuation material such as small polyiron or carbon particles. The selected attenuator pad 12 is glued, snapped, bolted, or the like to the antenna 40 where the antenna 40 uses parabolic reflector, a horn, or the like. For a whip or dipole type of the antenna 40, the attenuator pads 12–15 can be implemented as tubes. In order to prevent unintended signal attenuation, care should be taken that water from the outer environment cannot reach a space between the attenuator pad 12 and the antenna 40.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A radio communication system for resolving a near-far problem, comprising:

a plurality of customer premise transceivers each including an antenna for transmitting an upstream radio signal;

a hub transceiver for receiving said upstream radio signals; and exchangeable attenuators mounted outboard of said antennas, respectively, for attenuating said upstream radio signals in normal operation of the system, each of said exchangeable attenuators having an attenuation individually selected so that said upstream radio signals from all of said customer premise transceivers have a predetermined signal strength at the hub transceiver.

2. The radio communication system of claim 1, wherein:

the hub transceiver transmits downstream radio signals;

said antennas at the customer premise transceivers receive said downstream radio signals; and said attenuations provide a predetermined signal strength for said downstream radio signals to all of said customer premise transceivers.

3. The radio communication system of claim 1, wherein:

the hub transceiver transmits downstream radio signals;

the customer premise transceivers further include receive antennas for receiving said downstream radio signals; and further comprising:

receive attenuators mounted outboard said receive antennas, respectively, for attenuating said downstream radio signals in normal operation of the system, said receive attenuators having receive attenuations selected so that said downstream radio signals have predetermined signal strengths to said customer premise transceivers.

4. A method for resolving a near-far problem in a radio communication system, comprising:

providing a plurality of customer premise transceivers each including an antenna for transmitting upstream radio signals;

providing a hub transceiver for receiving said upstream radio signals;

selecting attenuations for said customer premise transceivers, respectively, for attenuating said upstream radio signals for providing a predetermined signal strength at the hub transceiver for said upstream radio signals from all of said customer premise transceivers; and mounting attenuators having said attenuations outboard said antennas, respectively, for attenuating said upstream radio signals in normal operation of the system.

5. The method of claim 4, further comprising:

transmitting downstream radio signals from said hub;

receiving said downstream radio signals with said antennas at the customer premise transceivers; and wherein:

attenuations provide a predetermined signal strength for said downstream radio signals to all of said customer premise transceivers.

6. The method of claim 4, further comprising:

transmitting downstream radio signals from said hub;

receiving said downstream radio signals with receive antennas at the customer premise transceivers;

selecting receive attenuations for said customer premise transceivers, respectively, for attenuating said downstream radio signals for providing predetermined signal strengths at the customer premise transceivers for said downstream radio signals; and mounting receive attenuators having said receive attenuations outboard said receive antennas, respectively, for attenuating said downstream radio signals in normal operation of the system.

\* \* \* \* \*